United States Patent [19]

Tood, Jr.

[11] Patent Number: 5,079,016

[45] Date of Patent: * Jan. 7, 1992

[54] COLOR-STABILIZED CAROTENOID PIGMENT COMPOSITIONS AND FOODS COLORED THEREWITH HAVING INCREASED RESISTANCE TO OXIDATIVE COLOR FADING

[75] Inventor: Paul H. Tood, Jr., Kalamazoo, Mich.

[73] Assignee: Kalamazoo Holdings, Inc., Kalamazoo, Mich.

[*] Notice: The portion of the term of this patent subsequent to Oct. 22, 2008 has been disclaimed.

[21] Appl. No.: 525,342

[22] Filed: May 16, 1990

[51] Int. Cl.$^5$ .............................. A23L 1/27
[52] U.S. Cl. .................... 426/250; 426/540; 426/541; 426/650
[58] Field of Search ............... 426/250, 540, 541, 650, 426/651, 654

[56] References Cited

U.S. PATENT DOCUMENTS

| | | | |
|---|---|---|---|
| 2,454,747 | 11/1948 | Weisblat et al. | 549/317 |
| 2,454,748 | 11/1948 | Weisblat et al. | 549/315 |
| 2,454,749 | 11/1948 | Wise | 549/315 |
| 3,110,598 | 11/1963 | Miller | 426/540 |
| 3,316,101 | 4/1967 | Borenstein | 426/540 |
| 3,455,838 | 7/1969 | Marotta et al. | 428/402.2 |
| 4,283,429 | 8/1981 | Todd et al. | 426/250 |
| 4,285,981 | 8/1981 | Todd et al. | 426/250 |
| 4,315,947 | 2/1982 | Todd et al. | 426/250 |
| 4,316,917 | 2/1982 | Antoshkiw | 426/540 |
| 4,343,823 | 8/1982 | Todd et al. | 426/250 |
| 4,504,499 | 3/1985 | Finnan | 426/250 |
| 4,844,934 | 7/1989 | Lueddecke et al. | 426/540 |
| 4,877,635 | 10/1989 | Todd, Jr. | 426/542 |

OTHER PUBLICATIONS

Fennema, O. R., Food Chemistry, 1985, p. 572, Marcel Dekker, Inc., N.Y.

Primary Examiner—Donald E. Czaja
Assistant Examiner—Leslie Wood
Attorney, Agent, or Firm—Gordon W. Hueschen

[57] ABSTRACT

Superior color-stabilized annatto, tomato, carrot, marigold, or synthetic carotenoid compositions, which embody certain surface-active agents, especially such compositions having increased resistance to color fading in foods exposed to oxidative stress, wherein an edible solid substrate for the carotenoid pigment or color may also be present, are disclosed, as well as: a method of stabilizing such a carotenoid pigment against oxidative discoloration; foodstuffs which may encounter oxidative stress and which are colored with a color-stabilized carotenoid composition of the invention; a method for coloring a foodstuff which may be subjected to oxidative stress by the employment of a color-stabilized carotenoid composition of the invention; the enhancement of color stabilization characteristics in the compositions and color-stabilizing effectiveness of the methods of the invention by the employment therein of a natural antioxidant; and the still further enhancement of the color-stabilizing characteristics of the compositions and color-stabilizing effectiveness of the methods of the present invention by the further employment therein of an edible oil-soluble ascorbic acid ester. Further, the use of a natural antioxidant, e.g., a Labiatae or tea extract or a tocopherol, alone to produce surprisingly effective color-stabilization in such carotenoid compositions, foodstuffs, and methods is also disclosed.

92 Claims, 1 Drawing Sheet

FIG. 1

COLOR-STABILIZED CAROTENOID PIGMENT COMPOSITIONS AND FOODS COLORED THEREWITH HAVING INCREASED RESISTANCE TO OXIDATIVE COLOR FADING

BACKGROUND OF THE INVENTION

1. Field of Invention

The stabilization of annatto (bixin and norbixin), tomato (lycopene), carrot (beta-carotene), marigold (xanthophyll), and synthetic carotenoid pigments upon exposure to air with certain digestible surface-active agents, and synergistic combinations of such stabilized pigments with natural antioxidants which further increase their stability.

2. Background of the Invention and Prior Art

The foregoing natural and synthetic carotenoids are important food colors, various forms of annatto and other natural carotenoid colors having been used for at least a century, and synthetic carotenoids having been available since about 1950. The color and hue of tomato paste affects its value.

Carotenoids have more recently been shown to have anticarcinogenic properties, perhaps due to their ability to quench singlet oxygen. Beta-carotene in particular has been associated with inhibition of lung cancer on the part of smokers in epidemiological studies, due to its widespread prevalence in good diets. Other carotenoids, particularly lycopene found in tomato, and bixin and norbixin from annatto, have been shown to have equal or superior singlet oxygen quenching properties, and are also potential anticarcinogenic agents.

Perhaps because of their effectiveness in quenching singlet oxygen, or perhaps because of other properties, carotenoids in general degrade rapidly upon exposure to air, or under thermal stress, particularly when oxidative stress is also present. This makes them less satisfactory than so-called "coal-tar" colors for use in many foods, such as snacks, breadings, cooking oils, and dried cheeses, as well as in emulsified foods containing air as a result of the emulsification process, or in baked goods. If used as a food supplement, for humans or animals, the stability in the feed is also questionable, even though synthetic antioxidants may be available for feed use.

Even where the carotenoid is not exposed to air, as in liquid preparations, antioxidants are commonly added to eliminate the slight oxidative stress which may occur due to oxygen in the headspace of the container.

Encapsulation is one way of avoiding degradation of pigments, and this has been achieved by dissolving the pigment in a solvent, such as chloroform, admixing the solution at a high temperature with an encapsulating agent such as gelatin, and removing the solvent quickly. In certain cases, bisulfite is used to prevent degradation, but this is ojectionable as a stabilizer. Other systems use thiopropionates as antioxidants, but these are not permitted in foods. Yet other systems depend on combinations of polyoxyethylene derivatives combined with BHA and BHT in the presence of substances which are cosolvents for the pigment and polyoxyethylene derivatives to make stable liquid combinations, from which the pigment will not crystallize. As shown in this specification, the presence of the polyoxyethylene derivative is highly destabilizing in the presence of oxygen, and the BHA/BHT antioxidants are ineffective.

The prior art shows condimental combinations of seasonings, including oleoresins of carotenoids, with various emulsifiers to achieve mutual compatibility as well as dispersibility in both oil and water. These systems did not have as their objective the stabilization of the pigments against oxidative or thermal stress and, indeed, suggested deleterious combinations of emulsifiers in terms of the objectives of this specification.

Accordingly, the present art is in great need of nontoxic, natural, effective systems which will preserve the color of carotenoids and their oleoresins when used in the manufacture of food which is subject to oxidative stress. This invention provides the first such system, which is much more effective than even an ethoxyquin system.

The heart of the invention lies in the totally unexpected effect which certain, but not all, emulsifiers have upon the stability of these pigments. As described hereinafter, these emulsifiers are not antioxidants, and indeed may have a slight pro-oxidant effect when added to vegetable oils. Accordingly, the stabilizing effect must be attributed to an unknown mechanism, such as inhibition of electron transfer in the pigment when it quenches singlet oxygen, which then renders it more immune to the attack of oxygen. This, however, is only a hypothesis and not intended to be limiting.

Since the emulsifiers used in the stabilizing systems of this invention are readily digested by the enzymes secreted in the digestive tract, they will not block the electron transfer potential of the pigments after absorption by the body. Therefore, they will not impair their health benefits when a component of the diet. In this respect, no harmful additive, such as ethoxyquin, is introduced into the diet to preserve their effectiveness.

Various combinations of natural antioxidants with the carotenoid-emulsifier systems achieve stabilities which none of the substances can achieve alone, and indeed the stabilities achievable, for all practical purposes, are greater than a year, as opposed to a month using present art. This opens entirely new uses for carotenoid pigments.

Among the specific carotenoids which benefit from the present invention are bixin and norbixin, pigments derived from annatto, lycopene, natural beta-carotene, xanthophyll, and the synthetics beta carotene, beta-apo-8-carotenal, canthaxanthin, and astaxanthin. Natural forms of the latter equally benefit.

There are four fundamental aspects of this invention:
1. Certain emulsifiers greatly inhibit degradation, especially color degradation.
2. Rosemary and other Labiatae extracts inhibit degradation to an extent much greater than their antioxidant power might suggest.
3. Single and multiple synergism is expressed using the combinations which are possible as a result of this disclosure.
4. Tocopherols and tea extract are also synergistic with combinations of the above.

As a consequence, particular stabilization systems can be developed for the specific carotenoid, carotenoid mixture, or food system involved which will preserve both the color and biological effect of the carotenoid.

THE INVENTION

The stability of annatto, tomato, carrot, marigold, and synthetic carotenoid pigments, when subjected to oxidative and thermal stress, is markedly increased by admixing them with certain emulsifiers, which emulsifiers are not antioxidants but rather affect the stability of the pigments in some other, unknown, manner. When combined with natural antioxidants, such as those found in rosemary and tea, and tocopherols, as well as a fat-soluble derivative of ascorbic acid, such as ascorbyl palmitate or stearate, a pronounced synergistic effect is realized. The resulting stabilized pigments are several orders of magnitude more stable than the unstabilized pigments or their oleoresins, and permit the substitution of these natural pigments for synthetic colors presently used in foods where the carotenoid pigments are unstable.

The Labiatae extracts in themselves are now found to be more potent preservatives for these carotenoids than their antioxidant properties alone would suggest.

The potential benefit to the public nutrition is great, since the synthetic, so called "coal tar" colors are considered to be potentially harmful, whereas the carotenoid pigments have provitamin A activity and are emerging as potentially-important anticarcinogens, as previously stated.

BRIEF DESCRIPTION OF THE DRAWINGS

Referring now to the drawings for a better understanding of the invention.

OBJECTS OF THE INVENTION

One object of the present invention is to provide superior color-stabilized annatto, tomato, carrot, marigold, and synthetic carotenoid compositions, which embody certain surface-active agents, especially such compositions having increased resistance to color fading in foods exposed to oxidative stress, wherein an edible solid substrate for the carotenoid pigment or color may also be present. Another object is the provision of a method of stabilizing such a carotenoidal pigment against oxidative discoloration. A further object is the provision of foodstuffs which may encounter oxidative stress and which are colored with a superior color-stabilized carotenoid composition of the invention. An additional object is the provision of a method for coloring a foodstuff which may be subjected to oxidative stress by the employment of a color-stabilized carotenoid composition of the invention. Still a further object is the enhancement of such color stabilization characteristics in the compositions and such color-stabilizing effectiveness of the methods of the invention by the employment therein of a natural antioxidant, and a still further object is the still further enhancement of the color-stabilizing characteristics of the compositions and color-stabilizing effectiveness of the methods of the present invention by the further employment therein of an edible oil-soluble ascorbic acid ester. Another object is to provide such advantageously color-stabilized annatto, tomato, carrot, marigold, or synthetic carotenoid compositions, foodstuffs, and methods which embody and/or employ only a natural Labiatae antioxidant such as rosemary, sage, or thyme, or a tocopherol, or tea extract, as surprisingly-effective color-stabilization agent. Moreover: to provide increased stability of carotenoids present in tomatoes, annatto, carrots, marigold, and other natural sources of carotenoids, as well as synthetic carotenoids; to provide stabilized systems of such carotenoids useful in hot oil; to provide systems of such carotenoids with rosemary, sage, thyme, or other Labiatae extract; and to provide a mechanism for stabilizing carotenoids in animal feeds and human food which does not involve the use of synthetic antioxidants. Still additional objects will become apparent hereinafter and yet other objects will be apparent to one skilled in the art.

SUMMARY OF THE INVENTION

The invention, then, comprises the following, alone or in combination:

A color-stabilized annatto, tomato, carrot, marigold, or synthetic carotenoid composition having increased resistance to color fading in foods exposed to oxidative stress consisting essentially of (A) a nonionic surface-active agent taken from the class consisting of:
  a. mono and di glycerides of fatty acids,
  b. polyglyceride esters of fatty acids,
  c. mono and diglyceride esters further esterified with a dibasic organic acid taken from the class consisting of citric and lactic acids,
  d. acetylated mono and diglyceride esters further esterified with a dibasic organic acid taken from the class consisting of citric and lactic acids,
  e. sorbitan esters of fatty acids, and
  f. propylene glycol esters of fatty acids,
  g. lecithin, and
(B) an annatto, tomato, carrot, marigold, or synthetic carotenoid, the proportion of (A) to (B) being at least ten percent (10%) by weight, optionally also comprising an edible solid particulate substrate for the carotenoid pigment or color; such a composition wherein the proportion of (A) to (B) is between about 0.1:1 and 1.2:1 by weight; such a composition comprising also a natural antioxidant taken from the class consisting of:
  a. a Labiatae extract,
  b. tocopherols, and
  c. tea extract; such a composition comprising also an edible oil-soluble ascorbic acid ester; such a composition comprising at least two of the anti-oxidants a., b., and c; also a method of stabilizing an annatto, tomato, carrot, marigold, or synthetic carotenoid pigment against oxidative discoloration comprising the step of admixing said pigment with a surface-active agent selected from those set forth as a. through g. in any of the foregoing; such a method also comprising the step of admixing the carotenoid pigment with a natural antioxidant selected from a Labiatae extract, tocopherols, and tea extract; and a foodstuff, which may encounter oxidative stress, which is colored with a condimental composition as set forth in any of the foregoing; also a method of coloring a foodstuff which may be subjected to oxidative stress comprising the step of admixing therewith a color-stabilized carotenoid composition as set forth in any of the foregoing; and such a method comprising also the step of admixing the carotenoid pigment with an edible oil-soluble ascorbic acid ester; such a method wherein the ascorbic acid ester is selected from ascorbyl palmitate or stearate.

Moreover, such a color-stabilized carotenoid composition wherein the surface-active agent is a sorbitan poly fatty acid ester or a monoglyceride of a fatty acid. Further, such a composition wherein the surface-active agent is sorbitan trioleate or comprising also as antioxidant a rosemary extract; such a method wherein the surface-active agent is sorbitan trioleate or comprising also as antioxidant a Labiatae extract; such a method wherein the surface-active agent is sorbitan trioleate and comprising also as antioxidant a rosemary or sage extract; such a foodstuff wherein the surface-active agent is a sorbitan poly fatty acid ester or a monoglyceride of a fatty acid; such a foodstuff comprising also an antioxidant which is a Labiatae extract, or a tocopherol, or a tea extract, especially a rosemary or sage extract.

Further, such a composition wherein the surface-active agent is sorbitan trioleate and comprising also as antioxidant a rosemary extract. Additionally, such a foodstuff comprising also an antioxidant which is an edible oil-soluble ascorbic acid ester, especially comprising also an antioxidant which is ascorbyl palmitate or stearate. Further, such a method wherein the method is carried out in the presence of an edible solid particulate substrate for the pigment; and such a method wherein the surface-active agent is sorbitan trioleate and the antioxidant is a rosemary or sage extract and, optionally wherein ascorbyl palmitate or stearate is also admixed with the carotenoid pigment. Finally, an annatto, tomato, carrot, marigold, or synthetic carotenoid composition wherein the carotenoid has a ⅓ life in excess of 220 hours at a temperature of 50° C. when dispersed on flour salt at a concentration of four percent (4%) by weight; such a composition wherein the carotenoid is bixin, beta-apo-8-carotenal, or beta-carotene; and an annatto, tomato, carrot, marigold, or synthetic carotenoid composition comprising a surface-active agent and optionally a natural antioxidant, wherein the carotenoid pigment has a ⅓ life greater than twice that of the carotenoid alone when dispersed on flour salt at a concentration of four percent (4%) by weight; and a color-stabilized carotenoid composition having increased resistance to color fading in foods exposed to oxidative stress consisting essentially of
(A) a natural antioxidant selected from the class consisting of:
  a. a Labiatae extract,
  b. a tocopherol, and
  c. tea extract, and
(B) a carotenoid,
the proportion of (A) to (B) being at least two percent (2%) by weight, and optionally also comprising an edible solid pulverulent or particulate substrate for the carotenoid pigment or color; such a composition wherein the proportion of (A) to (B) is between about five percent (5%) and 20 percent (20%) by weight; such a composition comprising a Labiatae extract of an at least two percent (2%) concentration; and such a composition comprising a rosemary, sage, or thyme extract.

MATERIALS AND METHODS

Wherever possible, commercial sources of materials have been used. Also, procedures known to the art, or herein identified as a tool to be used by the practitioner in the optimization of specific formulations, are described.

The Labiatae, e.g., rosemary and sage, extracts were prepared in accordance with Todd, U.S. Pat. No. 4,778,691, and standardized with standard Rancimat ™ methodology, as described in that patent, to give an antioxidant activity equivalent to that of Herbalox ™, Type O, which is a standard item of commerce available from Kalsec, Inc., Kalamazoo, MI, USA.

The emulsifiers were obtained from manufacturers, and are listed by their technical rather than trade names. They did not contain antioxidants.

Tea extract was derived from green tea leaves, and standardized to 16% of the antioxidant activity of the Herbalox ™.

Tocopherols and ascorbyl esters, e.g., palmitate, were food grade and obtained from a commercial manufacturer.

Flour salt was food grade and obtained from a manufacturer which supplies it to seasoning houses for use in making dispersions.

Methods: Unless otherwise specified, the effect of the emulsifier, rosemary, other antioxidants, and synergistic combinations were measured by exposing a dispersion of the carotenoid in soy oil on flour salt to air in an oven maintained at either 50 degrees or 65 degrees Celsius. The color was measured over time, and the number of hours required for the dispersion to lose one-third of its color is called the ⅓ life of the dispersion. As a rule of thumb, ½ of the ⅓ life in hours at 50 degrees gives the stability in days. Likewise, the number of hours to reach ⅓ life at 65 degrees is a close approximation of the stability in days. This technique is invaluable to the practitioner of the art, the number of potential advantageous combinations being enormous.

It is well known that, among the substrates for dispersion, salt gives the least stability. Dispersions on dextrose or in feeds have stabilities of several orders of magnitude greater, which is why they are not useful for screening studies, and why this invention offers such advantages when combined with a substrate which is less destabilizing than salt.

GLOSSARY OF TERMS

This glossary describes both abbreviations used in the specification and other technical terms and apparatus referred to.

| Abbreviation | Technical Term |
| --- | --- |
| BHA | butylated hydroxy anisole |
| BHT | butylated hydroxy toluene |

| Abbreviation | Technical Term |
|---|---|
| GMO | glycerol monooleate |
| PG | propylene glycol |
| SBO | soy bean oil |
| STO | sorbitan trioleate |
| SMS | sorbitan monostearate |
| 8-1-O | octaglycerol monooleate |
| 10-1-CC | decaglycerol mono-capric-caprylate |
| RM | rosemary extract, specifically Herbalox-O ™ product of Kalsec, Inc., Kalamazoo, Michigan |

Peroxide Value: This is also a standard test for evaluation of the degree to which an oil has been oxidized.

Labiatae Extract: The solvent extract of a Labiatae herb, and preferably rosemary, sage, or thyme, especially rosemary. The preferable form is that described in Todd U.S. Pat. No. 4,877,635, and standardized to an antioxidant strength of about twice that of BHT in soy oil, under the standard Rancimat ™ conditions. It is commercially available in the form of Herbalox ™.

Rancimat ™: An instrument which measures the induction time of an oleogenous substrate, usually at 120 degrees Celsius and at 18 liters of air per hour. This is an accepted methodology for determining relative strengths of preparations of antioxidants. The effectiveness is expressed as the induction time of the sample divided by the induction time of the control, as a percent.

⅓ life: This is the time it takes for ⅓ of the color of a sample of carotenoid or dispersed carotenoid oleoresin to fade under the conditions of the experiment. It is a highly-reproducible measurement, which is sufficiently accurate to evaluate the relative effectiveness of emulsifiers and synergistic combinations thereof. This technique will assist practitioners of the art to optimize formulations for specific uses.

Synergism: As defined in McGraw-Hill *Dictionary of Scientific and Technical Terms*: "An action where the total effect of two active components is greater than the sum of their individual effects." For example, if one additive increases the ⅓ life by 10 hours, and a second by 20 hours, and the combination of the two by 50 hours, the syngeristic effect is an additional (or plus) 20 hours.

Surface-Active Agent: In the context of this specification, it represents a nonionic surface-active agent taken from the class consisting of:
a. mono and di glycerides of fatty acids,
b. polyglyceride esters of fatty acids,
c. mono and diglyceride esters further esterified with a dibasic organic acid taken from the class consisting of citric and lactic acids,
d. acetylated mono and diglyceride esters further esterified with a dibasic organic acid taken from the class consisting of citric and lactic acids,
e. sorbitan esters of fatty acids, and
f. propylene glycol esters of fatty acids, and
g. lecithin, and equivalents thereof.

RM Rosemary Extract: The extract used is Herbalox ™, which is a commercial product available from Kalsec, Inc., standardized as to antioxidant activity, and about 20% active antioxidant compounds. It should be recognized, in this connection, that the art does not yet enable one to determine the exact concentration of active antioxidants in the extract, and 20% is merely an approximation based on the degree of dilution of the deodorized rosemary extract with soy oil.

DETAILED DESCRIPTION OF THE INVENTION

The following Examples are given by way of illustration only and are not to be construed as limiting.

EXAMPLE 1

Stabilizing effect of emulsifier, rosemary, and synergistic effects of their combination on the stability of bixin and beta-apo-8-carotenal.

Microcrystalline beta-apo-8-carotenal was diluted with soy bean oil to a concentration of 4%. An annatto extract was similarly diluted to a concentration of 5% microcrystalline bixin. These preparations were diluted as follows: (1) control: equal parts of SBO; (2) 0.5 parts pigment solution, 0.48 parts SBO, 0.02 parts RM; (3) 0.5 parts pigment solution, 0.48 parts STO, 0.02 parts SBO; and (4) 0.5 parts pigment solution, 0.48 parts STO, 0.02 parts RM. The mixtures were dispersed at 4% on flour salt, small equal amounts weighed into test tubes, and placed in an oven at 50 degrees Celsius. Samples were periodically withdrawn and assayed for color by extraction into acetone. The color strength was plotted, as in FIG. 1, and the time required for ⅓ of the color to fade was determined. This is reported as the ⅓ life in Table 1.

TABLE 1-1

⅓ lives of dispersed carotenoids, with and without stabilization.

| carotenoid soln. | | | ⅓ life, hours, 50 degrees C. | | synergism | |
|---|---|---|---|---|---|---|
| | | | actual | gain | hours | % of control |
| beta-apo-8 carotenal | (1) | control | 51 | | | |
| | (2) | 2% RM | 300 | 249 | | |
| | (3) | STO | 169 | 118 | | |
| | | | | 367 | | |
| | (4) | RM + STO | 461 | 410 | 43 | 84% |
| bixin | (1) | control | 84 | | | |
| | (2) | RM | 185 | 101 | | |
| | (3) | STO | 371 | 287 | | |
| | | | | 388 | | |
| | (4) | RM + STO | 563 | 479 | 91 | 108% |

The gain in hours of the ⅓ life of the RM and of the STO individually is summed, and the difference between this sum and the actual ⅓ life of the combination is the synergistic effect in hours. This is also reported as a % of the control, which in the case of bixin represents 108% of the ⅓ life of the control. In other words, in this case the synergistic effect is greater than the stability of the pigment by itself, which portrays the power of the combination.

Figure 1:
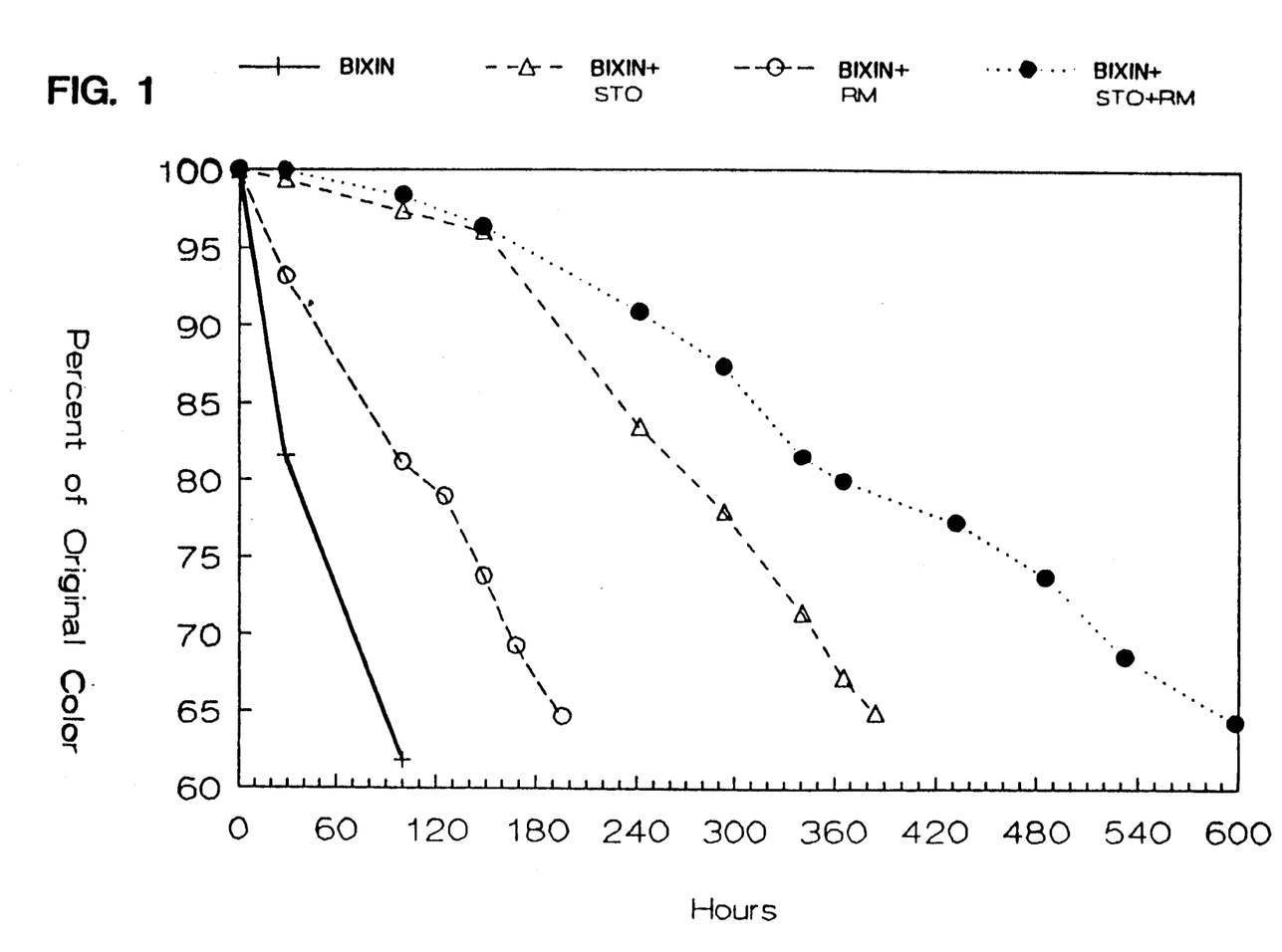
FIG. 1 is a graph showing the comparative fading rates of 4% weight by weight dispersions of bixin at 50%C wherein the ordinate shows the percent of original color at 460 nm retained by the sample and the abscissa shows the time period in hours required for ⅔ of the color to fade, thereby to provide the standard "⅔ life", there being a control (bixin) and three (3) color-stabilizing compositions in the test, the bixin-STO, the bixin-RM, and the bixin plus STO plus RM curves illustrating the effectiveness of compositions of the present invention, their superiority in stabilizing bixin against color fading being readily apparent from the graph of FIG. 1.

FIG. 1 visually demonstrates the ⅓ life curves for the bixin tests. The bixin itself obviously fades rapidly, and each addition roughly doubles the stability of the prior sample. Not only is it unexpected that STO should stabilize the pigment, but also that the RM and especially the STO-RM combination should be so very effective. Since the microcrystalline bixin is suspended in soy oil, it is also clear that the soy-oil itself is being stabilized. The curves for other carotenoids, and specifically beta carotene, canthaxanthin, and astaxanthin are similar in shape before and after stabilization. This example not only demonstrates the totally unexpected and unexplained effect of a preferred emulsifier, sorbitan trioleate, in increasing the stability, but it also demonstrates synergistic effect. The same synergistic effect is observed with the surface active agents of the preferred classes of Example 2. It also points out one of the unique properties of these combinations: the rosemary may have a greater effect than the emulsifier on one carotenoid, but a lesser effect on another carotenoid. This is why a practioner must use the described techniques to optimize formulas which may have applications as diverse as breadings, dressings, feeds, and frying oils.

EXAMPLE 2

Classification of non-ionic emulsifiers (surface active agents) in relation to stabilizing and synergistic effects.

It is clear from the above examples that many combinations of emulsifiers and antioxidants can be made. Because there are so many food grade emulsifiers available, it will be helpful to one practising the art to evaluate their desired combinations using the technique shown in these prior Examples. The following classification of emulsifiers may also provide assistance in selection.

For the purposes of this specification, emulsifiers are separated into three classes: (1) those exhibiting strong stabilizing and synergistic properties; (2) those exhibiting stabilizing properties but relatively modest synergizing properties; and (3) those which are destabilizing and/or cause negative synergism. The latter class is specifically excluded from this invention, since it is detrimental to the stabilizing effect of rosemary, tocopherols, and the like, as well as to the stability of the oleoresin dispersion without any added natural antioxidant.

It will occur to the practitioner, as the table is studied, that the classification is independent of the hydrophil-lipophil balance of the emulsifier. Accordingly, this invention enables the practitioner to design a stabilizing system for carotenoid pigments which is best adapted to the physical needs of the specific food in which the coloring will be used.

(1) Surface active agents or emulsifiers with strong stabilizing and synergistic properties with natural antioxidants:
   sorbitan esters, such as mono and tri oleates and stearates
   lactic acid esters of mono and diglycerides
(2) Surface active agents or emulsifiers with strong stabilizing and modest synergistic properties:
   polyglycerol esters of fatty acids, such as octaglycerol monooleate, decaglycerol capric-caprylate, and decaglycerol tetraoleate
   mono-diglycerides of fatty acids, such as glycerol mono oleate
   acetylated monoglycerides
   citric acid esters of mono-diglycerides
   lecithin (may cause discoloration to brownish shade and unpleasant aromas)
   propylene glycol esters of fatty acids

| (3) Emulsifiers with destabilizing and/or anti-synergistic properties. (The % anti-synergistic effect is shown in combination with rosemary). | |
|---|---|
| | % syn |
| tartaric acid esters of mono diglycerides | −97% |
| triacetic acid ester of glycerine | −18% |
| polyoxyethylene derivates, such as polysorbitan mono oleate and stearate. (Exceptionally destabilizing and anti-synergistic). | −76% |
| propylene glycol | −64% |

Emulsifiers in the first class are the preferred embodiments of this invention, whereas those in the second class are less preferred, and those in the third class are surprisingly deleterious. It is remarkable that, except for the polyoxyethylene derivatives, there is no structural relationship between the emulsifiers and the classes into which they fall.

Emulsifiers falling within the first two classes are within the scope of this invention, and the practitioner should recognize that, even though it may appear desirable to include an emulsifier of the third class in a composition, because of its superior emulsification properties, it will detract from the stabilizing emulsifiers and synergisms, and every effort to avoid inclusion of even incidental amounts should be made.

EXAMPLE 3

Effect of rosemary extract and non-ionic surface active agents in preventing fading of pigments upon heating.

The unexpected improvement of stability of bixin and beta-apo-8-carotenal, in the presence of rosemary extract, and further in the presence of a non-ionic surface active agent, was demonstrated as follows:

51 parts of a 5% microcrystalline suspension of bixin was diluted in 49 parts of soy oil. Also, 51 parts of the bixin suspension was mixed with 2 parts of rosemary extract and 47 parts of soy oil. A third mixture was made consisting of 51 parts of the bixin suspension, 2 parts of rosemary, and 47 parts of sorbitan trioleate.

The above mixtures were mixed with soy oil ar a level of 0.2%, and the resulting red oils placed in tubes in a heated block at 130 degrees C. After one hour, the % color loss at 487 nm was determined. The control had lost half its color, whereas the rosemary sample had lost only 26%, and the sample containing both rosemary and sorbitan trioleate only 7%. This shows both the effectiveness of the rosemary by itself in improving heat stability, as well as the marked improvement effected by the sorbitan fatty acid ester.

A similar series was run using beta-apo-8-carotenal, which is more stable than bixin. At the end of one hour, the control had lost 24% of its color, the sample containing rosemary only 10%, and the sample containing both rosemary and sorbitan trioleate 9%. In this case the sorbitan esters did not markedly increase the stability, perhaps due to the highly stabilizing effect of the rosemary.

EXAMPLE 4

The stabilizing effect of rosemary extract, sorbitan trioleate, and combinations thereof on synthetic and natural beta-carotene.

This example shows that the same type of stabilizing effect is achieved with synthetic beta-carotene, as has been shown for other carotenoids in the prior examples.

A 30% suspension of microcrystalline beta-carotene in vegetable oil was mixed with an equal part of soy oil (Solution 1). From this a control solution (A) was made by diluting with equal parts of soy oil. Three test solutions were made by admixing (1) with equal parts of sorbitan trioleate (B); by admixing 50 parts of (1) with 4 parts rosemary extract and 46 parts of soy oil (C); and by admixing 50 parts of (1) with 4 parts of rosemary extract and 46 parts of sorbitan monooleate(D).

4% dispersions of the above mixtures (A) to (D) were made on flour salt, and placed in an oven maintained at 50 deg. C. In this experiment, the time required for ½ the color to fade was determined, with the following results:
(A) 43 hours
(B) 62 hours
(C) 64 hours
(D) >85 hours (test discontinued)

It is clear that both the sorbitan ester and the rosemary individually have strong and unexpected stabilizing power, and that the combination is unexpectedly powerful. Synthetic antioxidants, such as BHT and BHA, do not snow a significant effect in this application, which is also surprising in that it points out the unique qualities of both the surface active agent, the rosemary (or other Labiatae extract), and the combinations thereof.

An extract of carrot, containing the natural beta carotene, was also stabilized with 5% rosemary extract, and its stability was 330% of that of the control without rosemary. This shows that this invention is as effective on natural forms as on synthetic forms of the pigments. Lesser concentrations down to about two (2) percent by weight may be used with somewhat reduced effectiveness, and economical considerations alone govern the highest concentration which may be employed. The weight ratio of natural antioxidant to carotenoid is also limited only by economic considerations, but usually need not exceed twenty (20) percent, as little as two (2) percent being advantageous and five (5) percent appearing to be about optimal.

The same effect is obtained with all the other carotenoids mentioned herein, as well as paprika, but especially bixin, and using other Labiatae extracts, e.g., sage or rhyme extract, in place of rosemary extract, or by substitution or addition of a tocopherol or tea extract.

EXAMPLE 5

The effectiveness of combinations of natural antioxidants and non-ionic surface active agents.

Example 1 demonstrates the unexpected synergism which is exhibited between rosemary and sorbitan trioleate, as a preferred representative of the class of non-ionic surface active agents. This example shows that tocopherols significantly interact with these stabilizers to further improve the stability of the carotenoid pigments.

A 20% solution (1) of beta-apo-8-carotenal in soy oil was prepared. The following mixtures were dispersed at a 2% level on flour salt and placed in an oven at 65 deg. C., and the ½ life determined;

| % of mixture | | | | | ½ life | |
|---|---|---|---|---|---|---|
| soln. (1) | SBO | RM | Toco. | GMO | hours | % of control |
| 19 | 81 | | | | 21 | |
| 19 | 79 | 2 | | | 91 | 433% |
| 19 | 79 | | 2 | | 34 | 161% |
| 19 | 64 | 2 | 2 | 13 | 116 | 552% |

Similarly, a combination of 51 parts of a 7.4% microcrystalline bixin suspension, 2 parts of rosemary, 2 parts of tocopherols, 13 parts of glycerol monooleate, and 32 parts of sorbitan monostearate was dispersed at 2% on flour salt. A control containing 51 parts of the bixin and 49 parts of soy oil was dispersed at 2%, also. The ½ life at 65 deg. C. was 400% of the control without the stabilizers.

This example demonstrates the desirability of combining the unexpected stabilizing qualities of different natural antioxidants with non-ionic surface active agents to achieve totally unanticipated stabilites of the pigments.

Sage and thyme extracts behave very similarly to rosemary, whereas tea extract is best combined directly with a non-ionic surface active agent (and particularly a polyglycerol) prior to removal of the extracting solvent, since it is solid and difficult to dissolve directly. It is equally efficacious in stabilization of the pigments described herein.

EXAMPLE 6

Applications of the stabilized carotenoids of this invention.

To one familiar with the art, the utility of the stabilized pigments immediately becomes apparent. For example, dispersions of the pigments on salt, dextrose, or the like, by themselves or in combination with other condiments, greatly extend the shelf life of a snack, cracker, or breading on which they are dusted.

When incorporated into an oil used for the frying of a food, such as chicken, they will retain color and the food will have an improved appearance. When added to an oil for popping corn, the color retention will be enhanced both during popping, as well as when the popped corn is kept in a container.

When added to a breading as part of the batter or breading mix, or to a cake mix, the color retention will be improved and the appearance of the final food will be improved. Shelf lives of breading, batter, and cake mixes are doubled, tripled, or quadrupled, depending upon the non-ionic surface active agents chosen for the particular application, and the combinations of rosemary, sage, tea, and tocopherols which may be used in the specific application.

The same utility is found when the stabilized pigments are used in animal or fish feed, for they prevent degradation during manufacture of the feed, as well as stabilizing the pigments during storage of the feed. No artificial ancioxidants are required, and therefore they can be eliminated from the food chain.

An especially preferred use of the invention is the stabilization of marigold extract, which is used in chicken feed. The xanthophylls are utilized by the chicken to color egg yolks, and the value of the feed is determined by the xanthophyll content at the time it is eaten by the chicken. Such seeds normally are stored some weeks before consumption, with degradation of the pigments occuring. By mixing the marigold extract with the rosemary and sorbitan trioleate, in the proportions used with the bixin of Example 1, equal relative increases in stability are obtained. The marigold extract equally benefits from the presence of other natural Labiatae antioxidants, and tocopherols, in the presence of the non-ionic surface active agent, as disclosed for the other carotenoid pigments in these examples.

When admixed with a tomato or other product containing lycopene, these stabilizing preparations inhibit both oxidative and light accelerated degradation of pigment. They therefore are suitable for direct admixing into a tomato juice or paste. They improve the color retention and brightness of such pastes when used in a sauce, such as on pizza, and especially when baked or microwave cooked.

The above mentioned uses of the stabilized pigments of this invention is not intended to be limiting, but is merely illustrative of the new art herein described. The examples show how the many disclosed combinations may be adapted for maximum benefit in a given application.

EXAMPLE 7

Stabilization of tomato pigments.

Lycopene is the predominant pigment in tomatoes, and it has been reported to have about twice the singlet oxygen quenching ability of beta carotene. It is suspected that the anti-carcenogenic properties of beta carotene are linked to this ability, and as such the preservation of lycopene in the processing of tomatoes is important to the public health as well as to the attractiveness of the tomato juice or paste. This experiment describes the utility of the invention in preserving lycopene.

Ripe tomatoes were obtained from the market, and the juice extracted. To the juice, the following was added:

1. control—nothing added.
2. rosemary extract at 0.04%
3. (rosemary extract 1 parts+sorbitan trioleate 4 parts) to give a concentration of the rosemary extract of 0.04%, and non-ionic surface active agent or 0.16%.
4. Sorbitan trioleate at 0.16%.

The mixture was stirred in a Waring blender to incorporate the stabilizers. The juice was then divided into two portions. Portion A was retorted as it was. Portion B was concentrated three fold in a rotary evaporator at 23" vacuum to a paste. The colors of the juice and the concentrates were compared.

The results are as follows:

|   | juice | concentrate |
|---|---|---|
| 1. control | brownish tinge | browner than juice |
| 2. rosemary | very slight brown | slightly brownish |
| 3. rosemary + STO | bright red | bright red |
| 4. STO | duller red | duller red |

From the above it is clear that the addition of a mixture of rosemary and non-ionic surface active agent, herein represented by sorbitan trioleate, acts to preserve the bright red color of the tomato juice better than either the rosemary or emulsifier alone.

Nevertheless, both rosemary and the emulsifier by themselves markedly improve the appearance of the retorted juice and concentrate. The improved appearance of the preparations 2 to 4 correspond with the improved nutritional properties due to stabilization of lycopene.

Other surface active agents, described in Example 2, have equally beneficial effects. Other natural antioxidants, including sage and thyme as representatives of Labiatae, tea, and tocopherols are also advantageously combined with a surface active agent and with each other to achieve improved appearance and nutritional value of the processed juice.

EXAMPLE 8

Further comparison of stabilization of carotenoids with surface active agents, Labiatae extracts represented by rosemary, sage, and thyme, tea extracts, and combinations thereof with common synthetic antioxidants.

As mentioned above, the common synthetic antioxidants BHA and BHT have little or no effect in the prevention of oxidative or thermal degradation of beta-carotene, bixin, beta-apo-8-carotenal, and the carotenoids commonly used for coloring the flesh of fish at the permitted use levels of 0.02%. Even at levels as high as 2-5%, the increase in stability is minimal.

In contrast, the admixture of a surface active agent, and especially the preferred agents described in Example 2, in amounts of ten percent or more of the preparation of the carotenoid, will enable the practitioner of the art to prepare dispersions of the carotenoids which will be stable for periods of time several-fold that of the control.

The most preferred form of the invention is to combine the surface active agent with a rosemary extract, which may be present at levels of up to ten percent or more of the preparation. If the carotenoid is synthetic, the mixture will further benefit from the addition of tocopherols, but this is not always the case with natural carotenoids, such as those derived from marigolds.

By use of the concept of ⅜ life, the practitioner will be able to formulate a stabilizing system which will optimize results for any given carotenoid preparation, to be used in a specific application. For example, if the carotenoid is to be encapsulated in gelatin, a polyglycerol ester may be preferred, since it will serve as a plasticizer for the gelatin as well as stabilizer for the carotenoid. If a dispersion on salt is to be prepared, sorbitan monostearate may be preferred to sorbitan trioleate, since the stearate is a saturated fatty acid. The Examples herein are not intended to be limiting, but rather merely to describe variations of the practice of this invention which will become apparent to one skilled in the art.

EXAMPLE 9

Single and multiple synergistic effects of emulsifier stabilizers with rosemary extract.

An unpredictable effect of the stabilizers is their ability to enhance the performance of natural antioxidants, such as those derived from Labiatae, and especially from Rosemary and Sage, in a synergistic manner. A second advantage is the expression of double synergism by combining the emulsifier-rosemary mixture with an additional antioxidant or antioxidants. This example utilizes a standard rosemary extract, Herbalox ®, to demonstrate the synergistic effect.

Table 9-1 shows synergistic combinations of preferred emulsifiers with rosemary, and multiple synergism when ascorbyl palmitate, a fat soluble ester of ascorbic acid, is used. It also shows that polysorbate 80 expresses negative synergism, as well as the destabilizing effect. This demonstrates the specificity of the non-ionic surface active emulsifier interaction, for which no explanation is available.

The ⅜ lives are reported in hours at 50 degrees. Column 1 reports the ⅜ lives. Column 2 reports the increase over the control. Column 3 shows the ⅜ life which would be expected if the combinations were not synergistic, and column 4 is the synergistic increase, which is the difference between column 4 and column 3. Column 5 reports the synergistic increase as a per cent of the ⅜ life of the control.

Composition of the samples was as follows: Annatto extract comprising 5% microcrystalline bixin, 0.5 parts; emulsifier if present 0.35 parts; rosemary if present 0.04 parts; ascorbyl palmitate if present; 0.006 parts; soy bean o 1 to make 1.00 parts total composition.

The Table clearly demonstrates the remarkable positive synergistic effect of the combination of rosemary and the two preferred emulsifiers shown. In addition to Polysorbate 80, propylene glycol, a common diluent in formulations, is shown to be deleterious and should be avoided (propylene glycol is not always considered to be an emulsifier). These positive and negative effects are observed in lesser doses, also.

TABLE 9-1

| | Synergistic Effects of Stabilizing Emulsifier and Rosemary extract. | | | | |
|---|---|---|---|---|---|
| | (1) | (2) | (3) | (4) | (5) |
| | | increase over control | | | |
| Emulsifier | life. hrs | actual | expected | synergy | % synergy |
| Synergism | | | | | |
| Control + | 82 | 0 | | | |
| rosemary | 220 | 138 | | | |
| Sorbitan trioleate + | 342 | 260 | | | |
| rosemary | 584 | 502 | 398 | 104 | 126% |
| Sorbitan stearate + | 360 | 278 | | | |
| rosemary | 607 | 525 | 416 | 109 | 132% |
| Polysorbate + | 25 | −57 | | | −69% |
| rosemary | 90 | 8 | 81 | −73 | −89% |
| Propylene glycol + | 79 | −3 | | | |
| rosemary | 194 | 112 | 135 | −23 | −28% |
| Double synergism | | | | | |
| Control | 82 | 0 | | | |
| Control + 0.6% ascorbyl palmitate | 190 | 108 | | | |
| Sorbitan trioleate + rosemary | 584 | 502 | | | |
| Sorbitan trioleate + 0.6% asc.palmitate + rosemary | 730 | 648 | 610 | 38 | 46% |

It should be noted that emulsifiers other than polysorbates and propylene glycol have negative synergism. Among these are acetylated tartaric acid esters of monoglycerides, and the triacetic acid ester of glycerine. Why some emulsifiers should have positive, and others negative, synergistic effects is not known.

Although stabilities are decreased as the level of stabilizers is decreased, it should be noted that synergistic effects increase. Therefor, synergism becomes even more significant as dosage levels become less.

An essential concept of this invention is the use of an emulsifier-stabilizer which has a single or double or multiple synergistic effect with the rosemary, sage, other Labiatae, or indeed, with o+-her natural antioxidants, such as tocopherols and tea extract.

In addition to ascorbyl palmitate and stearate, other edible oil-soluble esters are also operative for their synergistic color-stabilizing effect, such as ascorbyl oleate and the various oil-soluble ascorbic acid esters disclosed in U.S. Pat. Nos. 2,454,747, 2,454,748, and 2,454,749 to Weisblat and Wise.

It is thus seen that the present invention provides a color-stabilized carotenoid composition which embodies certain surface-active agents having increased resistance to color fading in foods exposed to oxidative stress, as well as a method of stabilizing such a pigment against oxidative discoloration, foodstuffs which may encounter oxidative stress colored with a composition of the invention, and a method of coloring a foodstuff with such a color-stabilized carotenoid composition of the invention. The method of stabilizing the carotenoid pigment is advantageously carried out in the presence of an edible solid substrate for the carotenoid pigment. Synergistic effects are obtained by the incorporation of a natural antioxidant in such compositions and methods and the color-stability of the compositions and the effectiveness of the methods is further enhanced by inclusion of an edible oil-soluble ascorbic acid ester therein, although employment of a natural antioxidant alone, e.g., a Labiatae antioxidant or tocopherols or tea extract, produces surprisingly effective color-stabilization results. All of the foregoing provide long-awaited solutions to previously-existing color instability and fading problems not adequately solved by the prior art.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

I claim:

1. A color-stabilized annatto, tomato, carrot, marigold, or synthetic carotenoid composition having increased resistance to color fading in foods exposed to oxidative stress consisting essentially of
    (A) a nonionic surface-active agent taken from the class consisting of:
        a. mono and di glycerides of fatty acids,
        b. polyglyceride esters of fatty acids,
        c. mono and diglyceride esters further esterified with a dibasic organic acid taken from the class consisting of citric and lactic acids,
        d. acetylated mono and ciglyceride esters further esterified with a dibasic organic acid taken from the class consisting of citric and lactic acids,
        e. sorbitan esters of fatty acids, and
        f. propylene glycol esters of fatty acids,
        g. lecithin, and
    (B) an annatto, tomato, carrot, marigold, or synthetic carotenoid,
    the proportion of (A) to (B) being at least ten percent (10%) by weight, optionally also comprising an edible solid particulate substrate for the carotenoid pigment or color.

2. A composition of claim 1, wherein the proportion of (A) to (B) is between about 0.1:1 and 1.2:1 by weight.

3. A composition of claim 1 or claim 2, comprising also a natural antioxidant taken from the class consisting of:
    a. a Labiatae extract, b. tocopherols, and
c. tea extract.

4. A composition of claim 3 comprising also an edible oil-soluble ascorbic acid ester.

5. A composition of claim 3 or claim 4 comprising at least two of the antioxidants a., b., and c.

6. The method of stabilizing an annatto, tomato, carrot, marigold, or synthetic carotenoid pigment against oxidative discoloration comprising the step of admixing said pigment with a surface-active agent selected from those set forth as a. through g. in claim 1.

7. The method of claim 6 also comprising the step of admixing the carotenoid pigment with a natural antioxidant selected from a Labiatae extract, tocopherols, and tea extract.

8. A foodstuff, which may encounter oxidative stress, which is colored with a condimental composition of claim 1.

9. A foodstuff, which may encounter oxidative stress, which is colored with a condimental composition of claim 2.

10. A foodstuff, which may encounter oxidative stress, which is colored with a condimental composition of claim 3.

11. A foodstuff, which may encounter oxidative stress, which is colored with a condimental composition of claim 4.

12. A foodstuff, which may encounter oxidative stress, which is colored with a condimental composition of claim 5.

13. The method of coloring a foodstuff which may be subjected to oxidative stress comprising the step of admixing therewith a color-stabilized carotenoid composition of claim 1.

14. The method of coloring a foodstuff which may be subjected to oxidative stress comprising the step of admixing therewith a color-stabilized carotenoid composition of claim 2.

15. The method of coloring a foodstuff which may be subjected to oxidative stress comprising the step of admixing therewith a color-stabilized carotenoid composition of claim 3.

16. The method of coloring a foodstuff which may be subjected to oxidative stress comprising the step of admixing therewith a color-stabilized carotenoid composition of claim 4.

17. The method of coloring a foodstuff which may be subjected to oxidative stress comprising the step of admixing therewith a color-stabilized carotenoid composition of claim 5.

18. The method of claim 7 comprising also the step of admixing the carotenoid pigment with an edible oil-soluble ascorbic acid ester.

19. The method of claim 7 comprising also the step of admixing the carotenoid pigment with an edible oil-soluble ascorbic acid ester selected from ascorbyl palmitate or stearate.

20. A color-stabilized carotenoid composition of claim 1 wherein the surface-active agent is a mono or di glyceride of a fatty acid.

21. A color-stabilized carotenoid composition of claim wherein the surface-active agent is a polyglyceride ester of a fatty acid.

22. A color-stabilized carotenoid composition of claim 1 wherein the surface-active agent is a mono or diglyceride ester further esterified with a dibasic organic acid taken from the class consisting of citric and lactic acids.

23. A color-stabilized carotenoid composition of claim 1 wherein the surface-active agent is an acetylated mono or diglyceride ester further esterified with a dibasic organic acid taken from the class consisting of citric and lactic acids.

24. A color-stabilized carotenoid composition of claim 1 wherein the surface-active agent is a sorbitan ester of a fatty acid.

25. A color-stabilized carotenoid composition of claim 1 wherein the surface-active agent is a propylene glycol ester of a fatty acid.

26. A color-stabilized carotenoid composition of claim 1 wherein the surface-active agent is a sorbitan poly fatty acid ester.

27. A color-stabilized carotenoid composition of claim 1 wherein the surface-active agent is a monoglyceride of a fatty acid.

28. A composition of claim 3 comprising also an antioxidant which is a Labiatae extract.

29. A composition of claim 3 comprising also an antioxidant which is a tocopherol.

30. A composition of claim 3 comprising also an antioxidant which is a tea extract.

31. A composition of claim 3 comprising also an antioxidant which is a rosemary or sage extract.

32. A method of claim 6 wherein the surface-active agent is a mono or di glyceride of a fatty acid.

33. A method of claim 6 wherein the surface-active agent is a polyglyceride ester of a fatty acid.

34. A method of claim 6 wherein the surface-active agent is a mono or diglyceride ester further esterified with a dibasic organic acid taken from the class consisting of citric and lactic acids.

35. A method of claim 6 wherein the surface-active agent is an acetylated mono or diglyceride ester further esterified with a dibasic organic acid taken from the class consisting of citric and lactic acids.

36. A method of claim 6 wherein the surface-active agent is a sorbitan ester of a fatty acid.

37. A method of claim 6 wherein the surface-active agent is a propylene glycol ester of a fatty acid.

38. A method of claim 6 wherein the surface-active agent is a sorbitan poly fatty acid ester.

39. A method of claim 6 wherein the surface-active agent is a monoglyceride of a fatty acid.

40. A method of claim 7 wherein the antioxidant is a Labiatae extract.

41. A method of claim 7 wherein the antioxidant is a tocopherol.

42. A method of claim 7 wherein the antioxidant is a tea extract.

43. A method of claim 7 wherein the antioxidant is a rosemary or sage extract.

44. A method of claim 13 wherein the surface-active agent is a mono or di glyceride of a fatty acid.

45. A method of claim 13 wherein the surface-active agent is a polyglyceride ester of a fatty acid.

46. A method of claim 13 wherein the surface-active agent is a mono or diglyceride ester further esterified with a dibasic organic acid taken from the class consisting of citric and lactic acids.

47. A method of claim 13 wherein the surface-active agent is an acetylated mono or diglyceride ester further esterified with a dibasic organic acid taken from the class consisting of citric and lactic acids.

48. A method of claim 13 wherein the surface-active agent is a sorbitan ester of a fatty acid.

49. A method of claim 13 wherein the surface-active agent is a propylene glycol ester of a fatty acid.

50. A method of claim 13 wherein the surface-active agent is a sorbitan poly fatty acid ester.

51. A method of claim 13 wherein the surface-active agent is a monoglyceride of a fatty acid.

52. A composition of claim 1 wherein the surface-active agent is sorbitan trioleate.

53. A composition of claim 1 comprising also as antioxidant a rosemary extract.

54. A method of claim 6 wnerein the surface-active agent is sorbitan trioleate.

55. A method of claim 6 comprising also as antioxidant a Labiatae extract.

56. A method of claim 55 wherein the surface-active agent is sorbitan trioleate.

57. A method of claim 56 comprising also as antioxidant a rosemary or sage extract.

58. A foodstuff of claim 8 wherein the surface-active agent is a mono or di glyceride of a fatty acid.

59. A foodstuff of claim 8 wherein the surface-active agent is a polyglyceride ester of a fatty acid.

60. A foodstuff of claim 8 wherein the surface-active agent is a mono or diglyceride ester further esterified with a dibasic organic acid taken from the class consisting of citric and lactic acids.

61. A foodstuff of claim 8 wherein the surface-active agent is an acetylated mono or diglyceride ester further esterified with a dibasic organic acid taken from the class consisting of citric and lactic acids.

62. A foodstuff of claim 8 wherein the surface-active agent is a sorbitan ester of a fatty acid.

63. A foodstuff of claim 8 wherein the surface-active agent is a propylene glycol ester of a fatty acid.

64. A foodstuff of claim 8 wherein the surface-active agent is a sorbitan poly fatty acid ester.

65. A foodstuff of claim 8 wherein the surface-active agent is a monoglyceride of a fatty acid.

66. A foodstuff of claim 65 comprising also an antioxidant which is a Labiatae extract.

67. A foodstuff of claim 65 comprising also an antioxidant which is a tocopherol.

68. A foodstuff of claim 65 comprising also an antioxidant which is a tea extract.

69. A foodstuff of claim 65 comprising also an antioxidant which is a rosemary or sage extract.

70. A composition of claim 8 wherein the surface-active agent is sorbitan trioleate.

71. A composition of claim 8 comprising also as antioxidant a rosemary extract.

72. A composition of claim 13 wherein the surface-active agent is sorbitan trioleate.

73. A composition of claim 13 comprising also as antioxidant a rosemary extract.

74. A foodstuff of claim 10 comprising also an antioxidant which is an edible oil-soluble ascorbic acid ester.

75. A method of claim 15 comprising also an antioxidant which is ascorbyl palmitate or stearate.

76. A method of claim 6 wherein the method is carried out in the presence of an edible solid particulate substrate for the carotenoid pigment.

77. A method of claim 7 wherein the method is carried out in the presence of an edible solid particulate substrate for the carotenoid pigment.

78. A method of claim 18 wherein the method is carried out in the presence of an edible solid particulate substrate for the carotenoid pigment.

79. A method of claim 19 wherein the method is carried out in the presence of an edible solid particulate substrate for the carotenoid pigment.

80. A method of claim 76 wherein the surface-active agent is sorbitan trioleate.

81. A method of claim 77 wherein the antioxidant is a rosemary or sage extract.

82. A method of claim 77 wherein the surface-active agent is sorbitan trioleate and the antioxidant is a rosemary or sage extract.

83. A method of claim 82 wherein ascorbyl palmitate or stearate is also admixed with the carotenoid pigment.

84. An annatto, tomato, carrot, marigold, or synthetic carotenoid composition wherein the carotenoid has a ⅔ life in excess of 220 hours at a temperature of 50° C. when dispersed on flour salt at a concentration of four percent (4%) by weight.

85. A composition of claim 84 wherein the carotenoid is bixin.

86. A composition of claim 84 wherein the carotenoid is beta-apo-8-carotenal.

87. A composition of claim 84 wherein the carotenoid is beta-carotene.

88. An annatto, tomato, carrot, marigold, or synthetic carotenoid composition consisting essentially of a surface-active agent and optionally a natural antioxidant, wherein the carotenoid pigment has a ⅔ life greater than twice that of the carotenoid alone when dispersed on flour salt at a concentration of four percent (4%) by weight.

89. A color-stabilized carotenoid composition having increased resistance to color fading in foods exposed to oxidative stress consisting essentially of
(A) a natural antioxidant selected from the class consisting of:
  a. a Labiatae extract,
  b. a tocopherol, and
  c. tea extract, and
(B) a carotenoid,
the proportion of (A) to (B) being at least two percent (2%) by weight, and
(C) a surface-active agent selected from a.-g. in claim 1, optionally also comprising an edible solid particulate substrate for the carotenoid pigment or color.

90. A composition of claim 89, wherein the proportion of (A) to (B) is between about five percent (5%) and 20 percent (20%) by weight.

91. A composition of claim 89 or 90 comprising a Labiatae extract of an at least two percent (2%) concentration.

92. A composition of claim 90 or 91 comprising a rosemary, sage, or thyme extract.

* * * * *

UNITED STATES PATENT AND TRADEMARK OFFICE
CERTIFICATE OF CORRECTION

PATENT NO. : 5,079,016

DATED : Jan. 7, 1992

INVENTOR(S) : Paul H. Todd, Jr.

It is certified that error appears in the above-identified patent and that said Letters Patent is hereby corrected as shown below:

```
Column 6, line 1; insert at the top of Column 6 before "optionally"
   and beginning a new paragraph: -- (C)  a surface active agent
   selected from a.-g.  --.(R&A 1-31-91, Pg. 1)
Column 8, line 18; "0 02" should read -- 0.02 --.
Column 10, line 31; "oil ar a" should read -- oil at a --.
Column 11, line 33; "rhyme" should read -- thyme --.
Column 12, line 40; "ancioxidants" should read -- antioxidants --.
Column 14, line 65; "o l" should read -- oil --.
Column 15, line 43; "o+-her" should read -- other --.
Column 16, line 51; "ciglyceride" should read -- diglyceride --.
Column 17, line 62; "claim wherein" should read --
   -- claim 1 wherein --.         (claim 21)
Column 18, approximately line 26; "wnerein" should read
   -- wherein --. (claim 32)
Column 20, line 35; "agent and" should read -- agent selected
   from a.-g. in Claim 1 and --.

Title page, column 1 under"United States Patent[19]" and column 1,
   [75] "Inventor:" (in both occurrences) "Tood, Jr." should read
   -- Todd, Jr. --.
```

Signed and Sealed this

Sixth Day of July, 1993

*Attest:*

MICHAEL K. KIRK

*Attesting Officer*   Acting Commissioner of Patents and Trademarks